(12) United States Patent
Van Cleve et al.

(10) Patent No.: US 7,597,007 B2
(45) Date of Patent: Oct. 6, 2009

(54) SPLIT BALANCE WEIGHTS FOR ELIMINATING DENSITY EFFECT ON FLOW

(75) Inventors: Craig Brainerd Van Cleve, Lyons, CO (US); Mark James Bell, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 360 days.

(21) Appl. No.: 11/570,848

(22) PCT Filed: Jul. 1, 2004

(86) PCT No.: PCT/US2004/021318

§ 371 (c)(1),
(2), (4) Date: Dec. 18, 2006

(87) PCT Pub. No.: WO2006/014153

PCT Pub. Date: Feb. 9, 2006

(65) Prior Publication Data

US 2008/0034891 A1   Feb. 14, 2008

(51) Int. Cl.
*G01F 1/84* (2006.01)
(52) U.S. Cl. .................................. 73/861.355
(58) Field of Classification Search ........... None
See application file for complete search history.

(56) References Cited

U.S. PATENT DOCUMENTS

| | | | |
|---|---|---|---|
| 4,831,885 A | 5/1989 | Dahlin | |
| 5,048,350 A | 9/1991 | Hussain et al. | |
| 5,054,326 A | 10/1991 | Mattar | |
| 5,321,991 A | 6/1994 | Kalotay | |
| 5,323,658 A | 6/1994 | Yao et al. | |

(Continued)

FOREIGN PATENT DOCUMENTS

EP   0905488 A2   3/1999

(Continued)

OTHER PUBLICATIONS

Patent Abstracts of Japan JP58178218, Oct. 19, 1983, Yokogawa Hokushin Electric Corp.

*Primary Examiner*—Harshad Patel
(74) *Attorney, Agent, or Firm*—The Ollila Law Group LLC (57) ABSTRACT

A Coriolis flow meter includes at least one flow conduit (103), including a first conduit node (603*a*) and a second conduit node (603*b*) and a bending axis W that intersects the flow conduit (103) at the first conduit node (603*a*) and at the second conduit node (603*b*). The flow conduit (103) vibrates around the bending axis W. The meter further includes a drive system (104) and a balance system (600) coupled to the flow conduit (103). The balance system (600) includes two or more Y-balance weights (601*a*, 601*b*) and two or more attachment members (602*a*, 602*b*) that couple the two or more Y-balance weights (601*a*, 601*b*) to the flow conduit (103). At least a first Y-balance weight (601*a*) is coupled to the flow conduit (103) at a first location between the first conduit node (603*a*) and the drive system (104) and at least a second Y-balance weight (601*b*) is coupled to the flow conduit (103) at a second location between the drive system (104) and the second conduit node (603*b*).

32 Claims, 6 Drawing Sheets

U.S. PATENT DOCUMENTS

| | | | |
|---|---|---|---|
| 5,814,739 | A | 9/1998 | Van Cleve |
| 5,850,039 | A | 12/1998 | Van Cleve et al. |
| 5,969,265 | A | 10/1999 | Van Cleve et al. |
| 5,979,246 | A | 11/1999 | Van Cleve et al. |
| 5,987,999 | A | 11/1999 | Van Cleve et al. |
| 6,314,820 | B1 | 11/2001 | Ollila |
| 6,327,915 | B1 | 12/2001 | Van Cleve et al. |
| 6,343,517 | B1 | 2/2002 | Van Cleve et al. |
| 6,354,154 | B1 | 3/2002 | Van Cleve et al. |
| 6,363,794 | B1 | 4/2002 | Van Cleve |
| 6,374,478 | B1 | 4/2002 | Neece et al. |
| 6,386,048 | B2 | 5/2002 | Van Cleve et al. |
| 6,397,684 | B1 | 6/2002 | Van Cleve |
| 6,450,042 | B1 | 9/2002 | Lanham et al. |
| 6,487,917 | B1 | 12/2002 | Van Cleve et al. |
| 6,520,028 | B1 | 2/2003 | Van Cleve et al. |
| 6,598,489 | B1 | 7/2003 | Van Cleve et al. |
| 6,634,241 | B1 | 10/2003 | Van Cleve |
| 7,287,438 | B2 * | 10/2007 | Van Cleve ............. 73/861.355 |
| 2002/0174730 | A1 | 11/2002 | Drahm et al. |
| 2003/0079554 | A1 | 5/2003 | Van Cleve |

FOREIGN PATENT DOCUMENTS

| | | |
|---|---|---|
| RU | 2107263 C1 | 3/1998 |
| WO | WO2004/099735 A1 | 11/2004 |

\* cited by examiner

SPLIT BALANCE WEIGHTS FOR ELIMINATING DENSITY EFFECT ON FLOW

BACKGROUND OF THE INVENTION

1. Field of the Invention

The present invention relates to force balancing a Coriolis flow meter using two or more split Y-balance weights.

2. Statement of the Problem

Vibrating conduit sensors, such as Coriolis mass flow meters, typically operate by detecting motion of a vibrating conduit that contains a material. Properties associated with the material in the conduit, such as mass flow, density and the like, in the conduit may be determined by processing signals from motion transducers associated with the conduit, as the vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations.

The magnitude of the time delay is very small; often measured in nanoseconds. Therefore, it is necessary to have the transducer output be very accurate. Transducer accuracy may be compromised by nonlinearities and asymmetries in the meter structure or from motion arising from extraneous forces. For example, a Coriolis mass flow meter having unbalanced components can vibrate its case, flanges and the pipeline at the drive frequency of the meter. This vibration perturbs the time delay signal in an amount that depends on the rigidity of the mount. Additionally, a Coriolis flow meter determines the density of the flow material based on the frequency of the drive mode. If the drive mode includes motion of the case, flanges, and pipeline, the performance of the density measurement can be adversely affected. Since the rigidity of the mount is generally unknown and can change over time and temperature, the effects of the unbalanced components cannot be compensated and may significantly affect meter performance. The effects of these unbalanced vibrations and mounting variations are reduced by using flow meter designs that are balanced and by using signal processing techniques to compensate for unwanted components of motion.

The balanced vibration discussed above involves only a single direction of vibration: the Z-direction. The Z-direction is the direction that the conduits are displaced as they vibrate. Other directions, including the X-direction along the pipeline and the Y-direction perpendicular to the Z and X-directions, are not balanced. This reference coordinate system is important because Coriolis flow meters produce a secondary sinusoidal force in the Y-direction. This force creates a meter vibration in the Y-direction that is not balanced, resulting in meter error.

One source of this secondary force is the location of the mass of the meter driver assembly. A typical driver assembly consists of a magnet fastened to one conduit and a coil of conductive wire fastened to another conduit. The Y-vibration is caused by the center of mass of the driver magnet and the center of mass of the driver coil not lying on the respective X-Y planes of the centerline(s) of the flow conduit(s). The X-Y planes are necessarily spaced apart to keep the conduits from interfering with one another. The centers of mass of the magnet and/or coil are offset from their planes because the coil needs to be concentric with the end of magnet to be at the optimum position in the magnetic field.

A flow conduit, when driven to vibrate, does not truly translate but rather cyclically bends about the locations at which it is fixed. This bending can be approximated by rotation about the fixed point(s). The vibration is then seen to be a cyclic rotation through a small angle about its center of rotation, CR. The angular vibration amplitude is determined from the desired vibration amplitude in the Z direction and the distance, d, from the center of rotation of the conduit center at the driver location. The angular amplitude of vibration, $\Delta\theta$, is determined from the following relation:

$$\Delta\theta = \arctan(\Delta Z/d) \qquad (1)$$

The offset of the driver component (magnet or coil assembly) center of mass from the conduit centerline causes the driver component center of mass to have a Y-component of its vibration. The driver component mass usually has an offset in the Z-direction that is at least equal to the conduit radius. The angular offset, $\phi$, from the conduit centerline is thus not negligible. The driver component mass oscillates about its offset position with the same angular amplitude as the flow conduit, $\Delta\theta$. Approximating the motion of the driver mass as being perpendicular to the line connecting the driver center of mass with the center of rotation, CR, the driver mass Y-direction motion, $\Delta Y_m$, can be solved from the following:

$$\Delta Y_m = \Delta Z \sin(\phi) \qquad (2)$$

The Y-direction motion of the driver component mass causes the whole meter to vibrate in the Y-direction. Conservation of momentum requires that, for a freely suspended meter, the Y-direction vibration of the entire meter is equal to the Y-direction vibration amplitude of the driver mass times the ratio of the driver mass divided by the meter mass. This Y-vibration of the entire meter is a direct result of the desired conduit vibration in Z in conjunction with the angular offset of the drive components' centers of mass. This coupling between the desired conduit vibration and the undesired Y-vibration of the entire meter means that damping of the meter Y-vibration damps the flow conduit vibration in Z, and that a stiff meter mount raises conduit frequency while a soft meter mount lowers conduit frequency. The change in conduit frequency with mounting stiffness has been observed experimentally in meters with high Y-vibration amplitude. It is a problem because conduit frequency is used to determine fluid density and frequency is also an indication of conduit stiffness. Changes in conduit stiffness due to mounting stiffness change the calibration factor of the meter. The direct coupling between the drive vibration and the local environment also results in an unstable zero (a flow signal when no flow is present) of the meter.

SUMMARY OF THE SOLUTION

The present invention helps solve the problems associated with unbalanced vibrational forces using a balance system that is sized and located so as to balance out the drive system.

Advantageously, in some embodiments the invention can maintain a substantially constant mass flow calibration factor over a wide range of possible flow material densities.

Some examples of a balance system include two or more Y-balance weights and two or more attachment members that couple the two or more Y-balance weights to a flow conduit. At least a first Y-balance weight is coupled to the flow conduit at a first location between the first conduit node and the drive system and at least a second Y-balance weight is coupled to flow conduit at a second location between the drive system and the second conduit node. The two or more Y-balance weights are sized and located such that the combined center of mass of the driver plus the two or more Y-balance weights lies substantially on the X-Y plane of the conduit centerline.

In some examples, two or more balance devices, called active-y-balances, can be configured on the flow conduit(s). An active-y-balance comprises a mass connected to one end of an attachment member, with the other end of the attachment member being attached to the flow conduit between the driver and a bending axis W. Active-y-balances can be used on one or both conduits depending on the locations of the mass centers of the magnet and coil and the type of flow meter configuration (i.e., single or dual conduits).

An active-y-balance works by using the Z-direction conduit motion to move the active-y-balance mass in the Y-direction. The Y-direction momentum of the active-y-balance can be designed to balance the Y-direction momentum of the drive components and to thereby prevent unwanted case and environment motion. By the principle of equivalence, this also makes the meter immune to environmental vibrations and damping.

Aspects

An aspect of the invention is a Coriolis flow meter comprising:

at least one flow conduit, with the at least one flow conduit including a first conduit node and a second conduit node and including a bending axis W that intersects the flow conduit at the first conduit node and at the second conduit node, wherein the at least one flow conduit vibrates around the bending axis W;

a drive system coupled to the at least one flow conduit; and a balance system coupled to the at least one flow conduit, with the balance system comprising two or more Y-balance weights and two or more attachment members that couple the two or more Y-balance weights to the at least one flow conduit, wherein at least a first Y-balance weight is coupled to the at least one flow conduit at a first location between the first conduit node and the drive system and at least a second Y-balance weight is coupled to the at least one flow conduit at a second location between the drive system and the second conduit node.

Preferably the drive system is located a vertical distance $Y_d$ above the bending axis W, the first Y-balance weight is located a vertical distance $Y_{w1}$ above the bending axis W, and the second Y-balance weight is located a vertical distance $Y_{w2}$ above the bending axis W.

Preferably a first ratio $Y_d/Y_{w1}$ is substantially one and one-half.

Preferably a first ratio $Y_d/Y_{w1}$ is substantially equal to a second ratio $Y_d/Y_{w2}$.

Preferably a first ratio $Y_d/Y_{w1}$ and a second ratio $Y_d/Y_{w2}$ are configured so that a drive frequency versus twist frequency ratio $\omega_{DRIVE}/\omega_{TWIST}$ is substantially constant over changes in fluid density of a flow medium in the at least one flow conduit.

Preferably the two or more Y-balance weights and the two or more attachment members are permanently coupled to the at least one flow conduit.

Preferably the two or more Y-balance weights and the two or more attachment members are removably coupled to the at least one flow conduit.

Preferably the two or more attachment members are at least partially deformable in response to motion of the at least one flow conduit.

Preferably a deformation of the two or more attachment members and the two or more Y-balance weights cause the natural frequency of the balance system to be less than the drive frequency of the flow meter.

Preferably the balance system vibrates substantially out of phase with the at least one flow conduit.

Preferably the balance system is sized and located such that the combined center of mass of the drive system and the balance system lies substantially proximate a plane of the centerline of the at least one flow conduit.

Preferably the balance system is located on the substantially opposite side of the at least one flow conduit from the drive system.

Preferably the balance system is located on the substantially opposite side of the at least one flow conduit from the drive system and at an orientation substantially forty-five degrees to a horizontal plane of the flow conduit.

Preferably the balance system is sized and located such that the momentum of the balance system is substantially equal and substantially opposite to the momentum of the drive system in a direction substantially perpendicular to a drive motion.

Preferably a mass $M_{split}$ of an individual Y-balance weight comprises substantially one-half of a mass of a single, driver-located weight $M_{single}$ multiplied by the cube of a vertical distance $Y_d$ of the drive system above the bending axis W divided by a vertical distance $Y_w$ of the individual Y-balance weight above the bending axis W.

An additional aspect of the invention is a method for force balancing a Coriolis flow meter, the method comprising:

providing at least one flow conduit, with the at least one flow conduit including a first conduit node and a second conduit node and further including a bending axis W that intersects the flow conduit at the first conduit node and at the second conduit node, wherein the at least one flow conduit vibrates around the bending axis W;

providing a drive system coupled to the at least one flow conduit; and providing a balance system coupled to the at least one flow conduit, with the balance system comprising two or more Y-balance weights and two or more attachment members that couple the two or more Y-balance weights to the at least one flow conduit, wherein at least a first Y-balance weight is coupled to the at least one flow conduit at a first location between the first conduit node and the drive system and at least a second Y-balance weight is coupled to the at least one flow conduit at a second location between the drive system and the second conduit node.

Preferably the drive system is located a vertical distance $Y_d$ above the bending axis W, the first Y-balance weight is located a vertical distance $Y_{w1}$ above the bending axis W, and the second Y-balance weight is located a vertical distance $Y_{w2}$ above the bending axis W.

Preferably a first ratio $Y_d/Y_{w1}$ is substantially one and one-half.

Preferably a first ratio $Y_d/Y_{w1}$ is substantially equal to a second ratio $Y_d/Y_{w2}$.

Preferably a first ratio $Y_d/Y_{w1}$ and a second ratio $Y_d/Y_{w2}$ are configured so that a drive frequency versus twist frequency ratio $\omega_{DRIVE}/\omega_{TWIST}$ is substantially constant over changes in fluid density of a flow medium in the at least one flow conduit.

Preferably the two or more Y-balance weights and the two or more attachment members are permanently coupled to the at least one flow conduit.

Preferably the two or more Y-balance weights and the two or more attachment members are removably coupled to the at least one flow conduit.

Preferably the two or more attachment members are at least partially deformable in response to motion of the at least one flow conduit.

Preferably a deformation of the two or more attachment members and the two or more Y-balance weights cause the natural frequency of the balance system to be less than the drive frequency of the flow meter.

Preferably the balance system vibrates substantially out of phase with the at least one flow conduit.

Preferably the balance system is sized and located such that the combined center of mass of the drive system and the balance system lies substantially proximate a plane of the centerline of the at least one flow conduit.

Preferably the balance system is located on the substantially opposite side of the at least one flow conduit from the drive system.

Preferably the balance system is located on the substantially opposite side of the at least one flow conduit from the drive system and at an orientation substantially forty-five degrees to a horizontal plane of the flow conduit.

Preferably the balance system is sized and located such that the momentum of the balance system is substantially equal and substantially opposite to the momentum of the drive system in a direction substantially perpendicular to a drive motion.

Preferably a mass $M_{split}$ of an individual Y-balance weight comprises substantially one-half of a mass of a single, driver-located weight $M_{single}$ multiplied by the cube of a vertical distance $Y_d$ of the drive system above the bending axis W divided by a vertical distance $Y_w$ of the individual Y-balance weight above the bending axis W.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
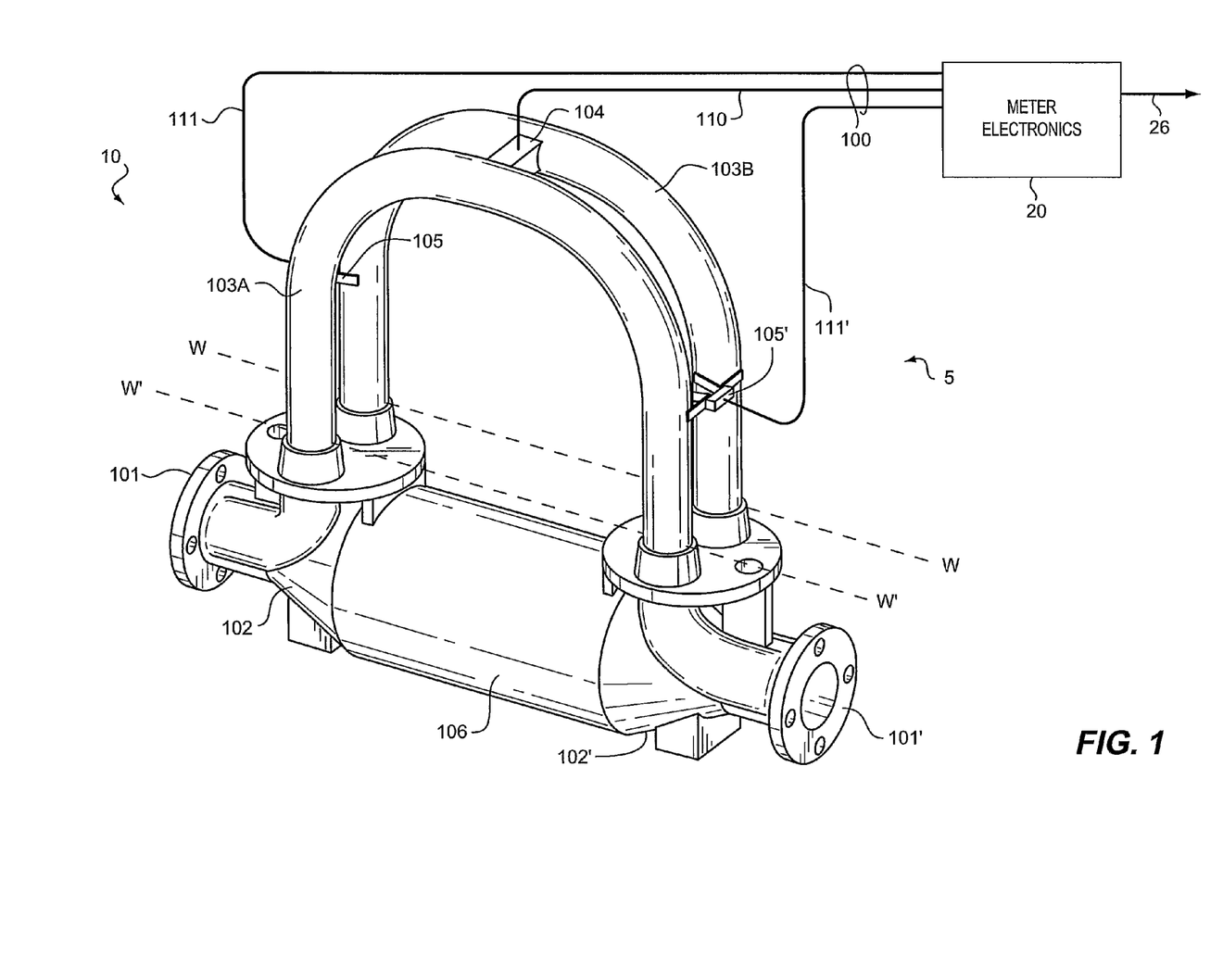
FIG. 1 illustrates a Coriolis flow meter comprising a flow meter assembly and meter electronics.

FIG. 1 illustrates a Coriolis flow meter 5 comprising a flow meter assembly 10 and meter electronics 20. Meter electronics 20 is connected to meter assembly 10 via leads 100 to provide density, mass flow rate, volume flow rate, totalized mass flow, temperature, and other information over path 26. It should be apparent to those skilled in the art that the present invention can be used by any type of Coriolis flow meter regardless of the number of drivers, pick-off sensors, flow conduits or the operating mode of vibration.

Flow meter assembly 10 includes a pair of flanges 101 and 101'; manifolds 102 and 102'; driver 104; pick-off sensors 105-105'; and flow conduits 103A and 103B. Driver 104 and pick-off sensors 105 and 105' are connected to flow conduits 103A and 103B. The flow meter assembly 10 can also include a temperature sensor (not shown).

Flanges 101 and 101' are affixed to manifolds 102 and 102'. Manifolds 102 and 102' are affixed to opposite ends of spacer 106. Spacer 106 maintains the spacing between manifolds 102 and 102' to prevent undesired vibrations in flow conduits 103A and 103B. When flow meter assembly 10 is inserted into a pipeline system (not shown) which carries the material being measured, material enters flow meter assembly 10 through flange 101, passes through inlet manifold 102 where the total amount of material is directed to enter flow conduits 103A and 103B, flows through flow conduits 103A and 103B and back into outlet manifold 102' where it exits meter assembly 10 through flange 101'.

Flow conduits 103A and 103B are selected and appropriately mounted to inlet manifold 102 and outlet manifold 102' so as to have substantially the same mass distribution, moments of inertia, and elastic modules about bending axes W-W and W'-W' respectively. The flow conduits extend outwardly from the manifolds in an essentially parallel fashion.

Flow conduits 103A-B are driven by driver 104 in opposite directions about their respective bending axes W and W' and at what is termed the first out-of-phase bending mode of the flow meter. Driver 104 may comprise one of many well known arrangements, such as a magnet mounted to flow conduit 103A and an opposing coil mounted to flow conduit 103B. An alternating current is passed through the opposing coil to cause both conduits to oscillate. A suitable drive signal is applied by meter electronics 20, via lead 110 to driver 104. The description of FIG. 1 is provided merely as an example of the operation of a Coriolis flow meter and is not intended to limit the teaching of the present invention.

Meter electronics 20 receives sensor signals on leads 111 and 111', respectively. Meter electronics 20 produces a drive signal on lead 110 which causes driver 104 to oscillate flow conduits 103A and 103B. Meter electronics 20 processes left and right velocity signals from pick-off sensors 105, 105' in order to compute a mass flow rate. Path 26 provides an input and an output means that allows meter electronics 20 to interface with an operator.

Figure 2:
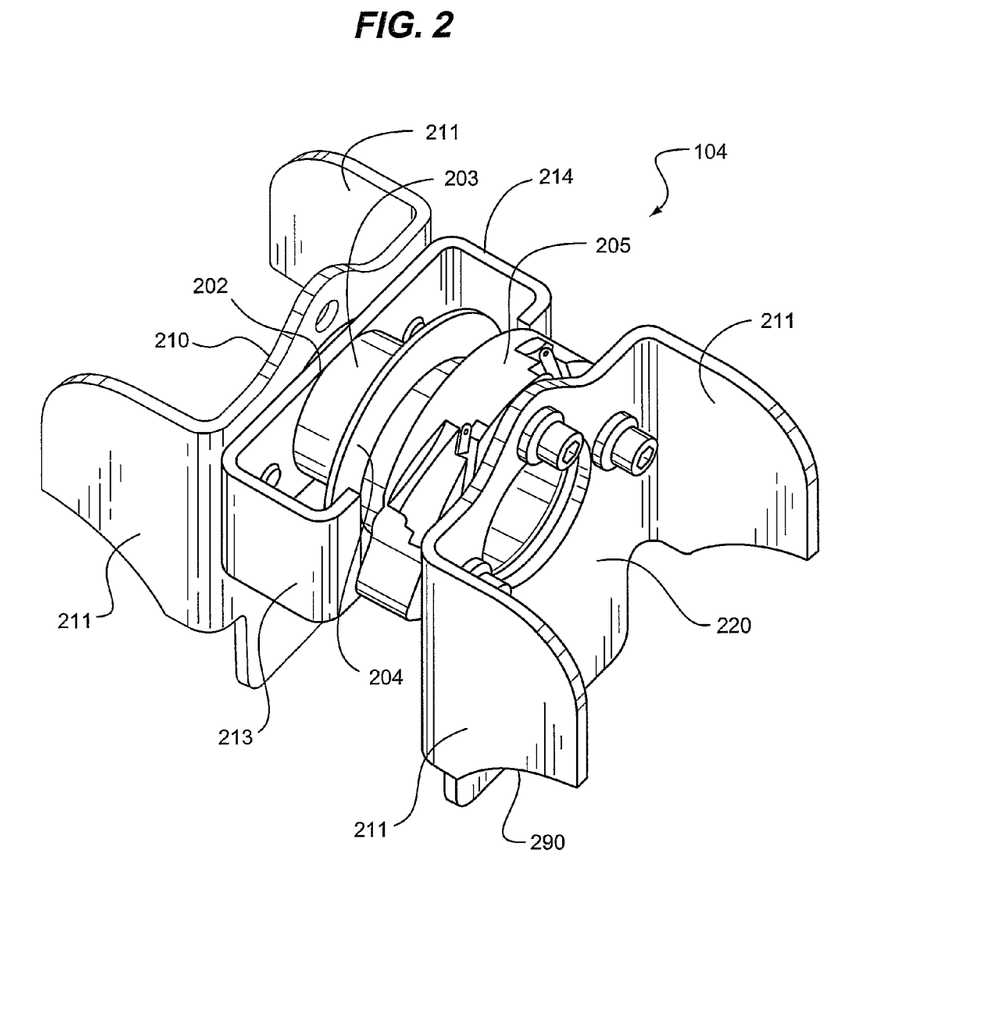
FIG. 2 illustrates a drive system in one embodiment of a Coriolis flow meter.

FIG. 2 illustrates a drive system 104 in one embodiment of a Coriolis flow meter 5. In a preferred exemplary embodiment, driver 104 is a coil and magnet assembly. One skilled in the art will note that other types of drive systems may be used.

Driver 104 has a magnet assembly 210 and a coil assembly 220. Brackets 211 extend outward in opposing directions from magnet assembly 210 and coil assembly 220. Brackets 211 are wings which extend outward from the flat base and have a substantially curved edge 290 on a bottom side that is formed to receive a flow conduit 103A or 103B. The curved edge 290 of brackets 211 are then welded or in some other manner affixed to flow conduits 103A and 103B to attach driver 104 to Coriolis flow meter 5.

Magnet assembly 210 has a magnet keeper 202 as a base. Brackets 211 extend from a first side of magnet keeper 202. Walls 213 and 214 extend outward from outer edges of a second side of magnet keeper 202. Walls 213 and 214 control the direction of the magnetic field of magnet 203 perpendicular to the windings of coil 204.

Magnet 203 is a substantially cylindrical magnet having a first and a second end. Magnet 203 is fitted into a magnet sleeve (not shown). The magnet sleeve and magnet 203 are affixed to a second surface of magnet keeper 202 to secure magnet 203 in magnet assembly 210. Magnet 203 typically has a pole (not shown) affixed to its second side. The magnet pole (not shown) is a cap that is fitted to the second end of magnet 203 to direct the magnetic fields into coil 204.

Coil assembly 220 includes coil 204, and coil bobbin 205. Coil bobbin 205 is affixed to a bracket 211. Coil bobbin 205 has a spool protruding from a first surface around which coil 204 is wound. Coil 204 is mounted on coil bobbin 205 opposing magnet 203. Coil 204 is connected to lead 110 which applies alternating currents to coil 204. The alternating currents cause coil 204 and magnet 203 to attract and repel one another which in turn causes flow conduits 103A and 103B to oscillate in opposition to one another.

Figure 3:
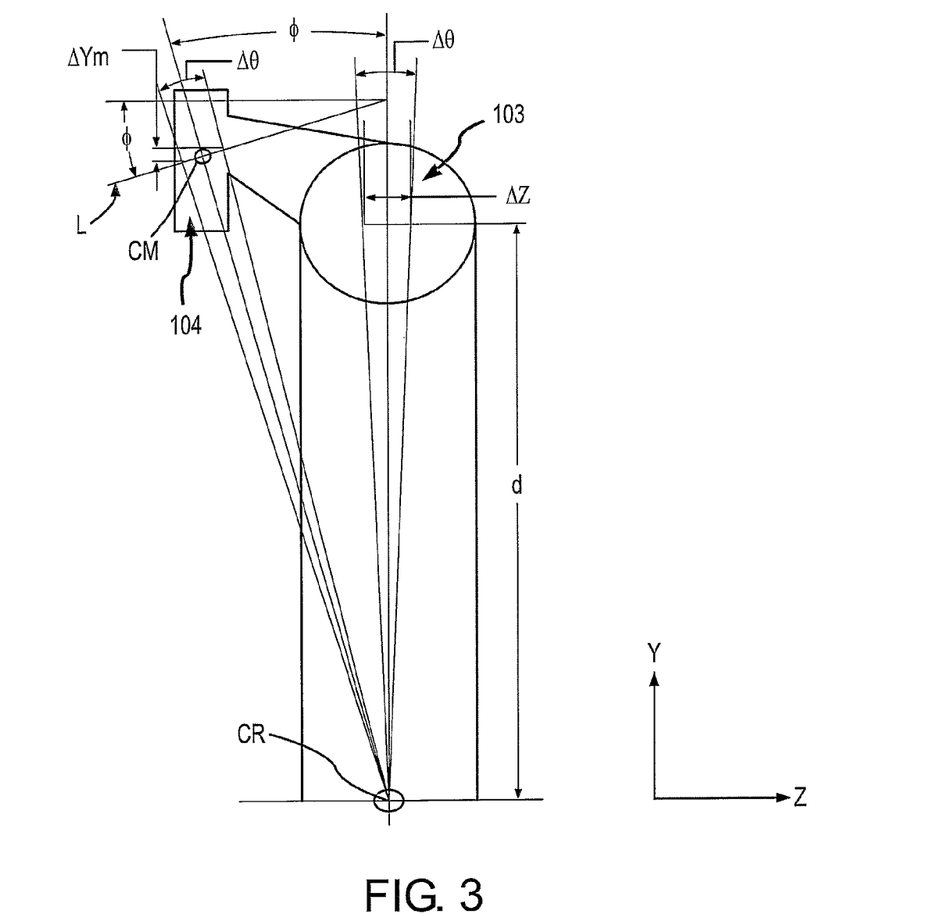
FIG. 3 illustrates an X-axis section view of a flow conduit of a Coriolis meter.

FIG. 3 illustrates a simplified X-axis section view of flow conduit 103. Flow conduit 103 has mounted to it driver 104. Driver 104 is offset from flow conduit 103 by $\phi$. Flow conduit 103 moves in the Z-direction with an amplitude $\Delta Z$. As flow conduit 103 translates in the Z-direction its fixed location causes it to rotate about its center of rotation, CR, resulting in angular amplitude, $\Delta\theta$. Driver 104 and its associated center of mass, CM, rotates with the same angular amplitude, $\Delta\theta$, as flow conduit 103. However, because of the offset angle, $\phi$, drive component center of mass CM oscillates up and down line L. This gives drive component center of mass CM vertical motion $\Delta Y_m$.

Figure 4:
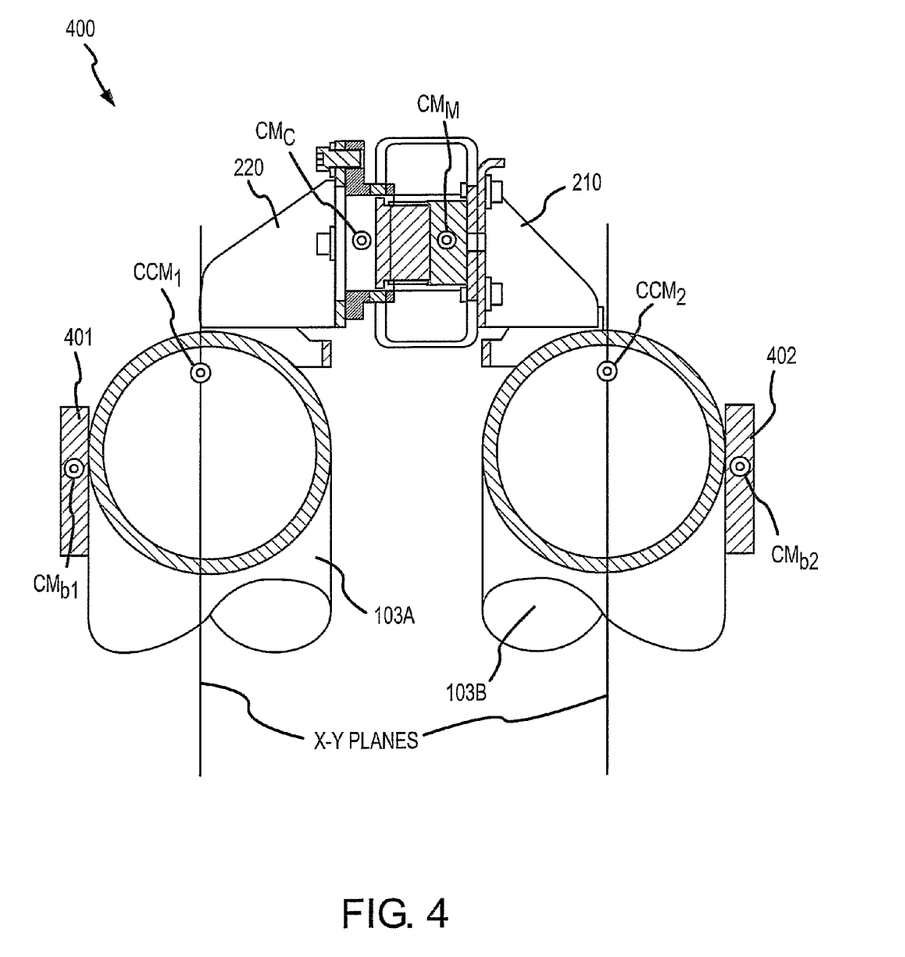
FIG. 4 illustrates a balance system in a first example of the invention.

FIG. 4 illustrates a balance system 400 in a first example of the invention. Balance system 400 includes Y-balance weights 401 & 402 coupled to flow conduits 103A & B. Coupling of Y-balance weights 401 & 402 can be accomplished using various methods including mechanical attachment, welding, brazing, or gluing. Y-balance weight 401 has a center of mass $CM_{b1}$. Y-balance weight 401 is sized and located such that its center of mass $CM_{b1}$ combined with the coil assembly center of mass $CM_c$ results in a combined center of mass $CCM_1$ that is located on the X-Y plane of conduit 103A. Also, Y-balance weight 402 has a center of mass $CM_{b2}$. Y-balance weight 402 is sized and located such that its center of mass $CM_{b2}$ combined with the magnet assembly center of mass $CM_m$ results in a combined center of mass $CCM_2$ that is located on the X-Y plane of conduit 103B. The particular attributes of the Y-balance weights are such that the mass times velocity of the Y-balance weight is equal and opposite to the mass times velocity of the driver assembly, in the Y-direction, for each flow conduit as shown by:

$$(M^*V_Y)_{BW} + (M^*V_Y)_{DA} = 0 \quad (3)$$

In other words the momentum of the Y-balance weight counters the momentum of the driver assembly attached to a particular conduit as given by:

$$(M_{BW})_Y + (M_{DA})_Y = 0 \quad (4)$$

Figure 5:
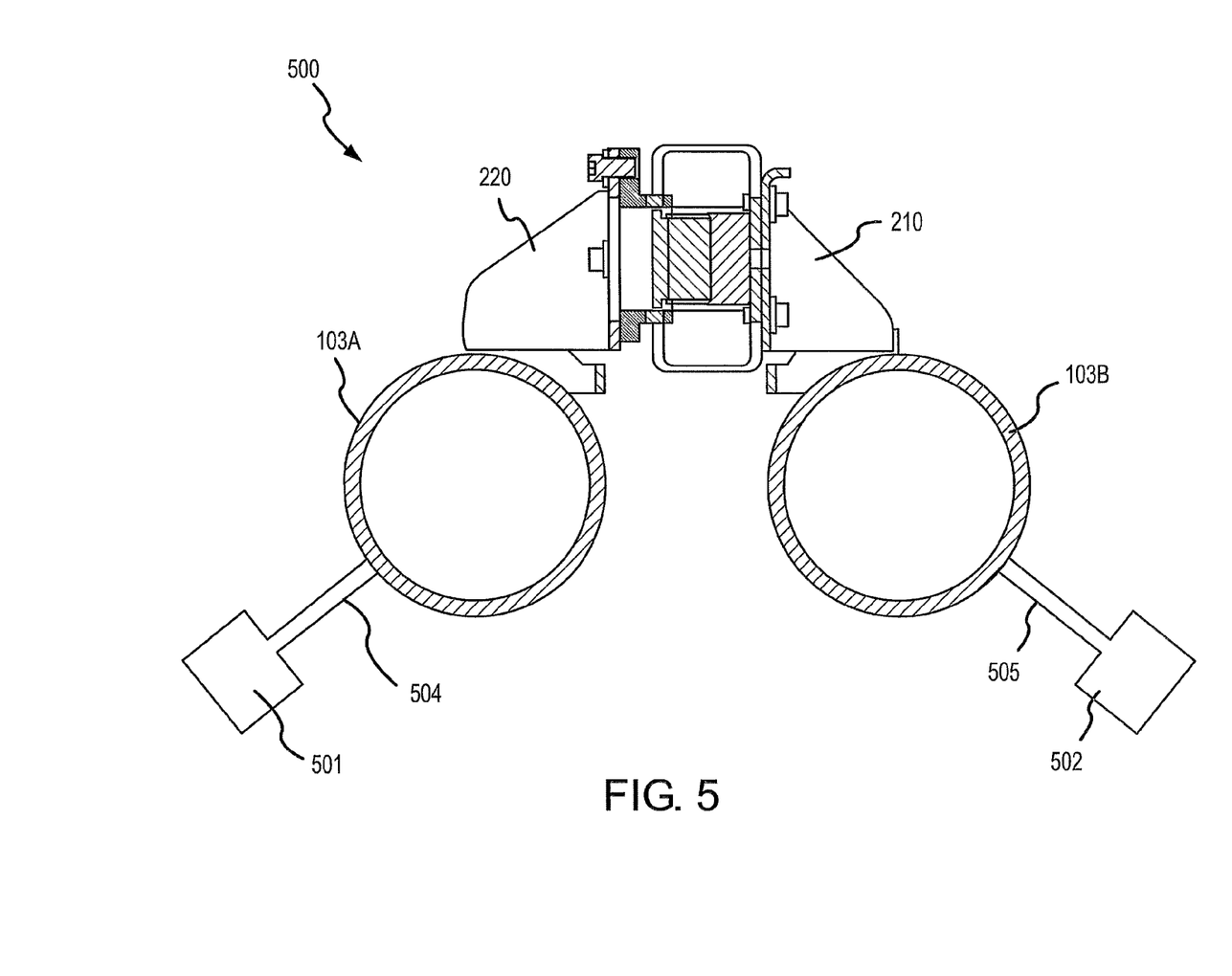
FIG. 5 illustrates a balance system in another example of the invention.

FIG. 5 illustrates balance system 500 in another example of the invention. Balance system 500 includes Y-balance weights 501 & 502 coupled to flow conduits 103A & B using leaf springs 504 & 505. Leaf spring 504 in this embodiment is oriented at approximately 45 degrees to the X-Y plane and is connected to the opposite side of the flow conduit as coil assembly 220. The stiffness of leaf spring 504 and mass of Y-balance weight 501 are chosen so that the natural frequency of the active-y-balance in its first vibration mode (the diving board mode) is below the drive frequency of the meter. With the natural frequency below the excitation (drive) frequency, weight 501 tends to move out of phase with conduit 103A. Thus, as conduit 103A moves to the left (-Z direction), active-Y-balance weight 501 moves to the right (+Z) relative to the conduit. But, because of the angle of leaf spring 504 to the X-Y plane, weight 501 is constrained by leaf spring 504 to move to the right and down (+Z and -Y). This is advantageous because when conduit 103A moves to the left, the offset coil assembly 220 moves left and up (+Z and +Y). By designing mass and spring rate such that the Y-direction momentum (mass times velocity) of the active-y-balance are equal and opposite to the Y-direction momentum of the offset driver components, the external Y-direction vibration of the entire meter can be nearly eliminated. The same design principles apply to tube 103B.

This second example has an additional advantage. Because weight 501 and 502 are suspended from conduits 103A & B by leaf spring 504 & 505, they vibrate out of phase with flow conduits 103A & B, resulting in very little of its mass being coupled to flow conduits 103A & B.

It should be understood that the angle and orientation of the leaf springs 504 and weights 501 in the figure are given for example. The angle and orientation of the leaf springs 504 and weights 501 can be varied and still achieve the goals of the invention.

Figure 6:
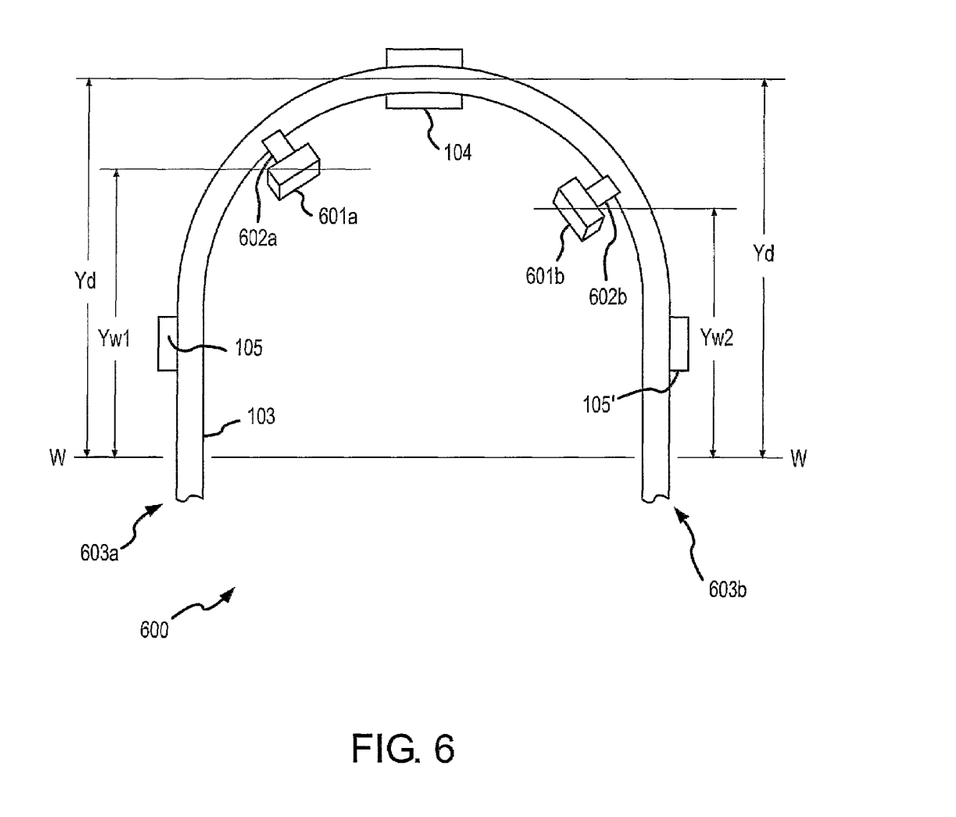
FIG. 6 illustrates a balance system in yet another example of the invention.

FIG. 6 illustrates a balance system 600 in yet another example of the invention. In this embodiment, the balance system 600 includes the flow conduit 103 having a first conduit node 603a and a second conduit node 603b, the drive system 104, pickoffs 105 and 105', at least first and second Y-balance weights 601a and 601b, and at least first and second attachment members 602a and 602b. The pickoffs 105 and 105' are located between the drive system 104 and the first conduit node 603a and the second conduit node 603b. It should be understood that the shape of the flow conduit 103 in the figure is given for example, and the flow conduit 103 can comprise other geometries. It should also be understood that the locations of the Y-balance weights 601a and 601b are also examples, and the locations can vary according to the flow tube material, the flow tube geometry, the flow material, temperature, driver vibration, driver mass, pick-off mass, construction tolerances, etc.

The flow conduit 103 can comprise a single conduit flow meter or can comprise a component of a two conduit flow meter (see FIG. 5). The flow conduit 103 vibrates around a bending axis W (see also the center of rotation CR in FIG. 3). The bending axis W intersects the flow conduit at the first conduit node 603a and at the second conduit node 603b.

The Y-balance weights 601 and attachment members 602 are coupled to the flow conduit 103. A first Y-balance weight 601a and a first attachment member 602a can be coupled to the flow conduit 103 between the first conduit node 603a and the drive system 104. Likewise, a second Y-balance weight 601b and a second attachment member 602b can be coupled to the flow conduit 103 between the drive system 104 and the second conduit node 603b. The first Y-balance weight 601a and the second Y-balance weight 601b can be permanently or removably coupled to the flow conduit 103 by the corresponding first attachment member 602a and second attachment member 602b. In addition, a removably coupled attachment member 602 can comprise a slidably coupled attachment member 602 that can be slidably positioned on the flow conduit 103.

Two or more Y-balance weights 601 are used in order to accurately and effectively perform Y-balancing of the flow meter 5, but without affecting a flow calibration characteristic of the flow meter 5. A problem that is encountered with a single Y-balance weight, attached at a single point on the flow conduit 103, is that the flow calibration factor can shift when the flow meter 5 is used for fluids of different densities. In order for the flow meter 5 to have a flow calibration factor that is independent of fluid density, the distribution of mass added to the flow conduit 103 has to be such that a drive frequency to twist frequency ratio (i.e., $\omega_{DRIVE}/\omega_{TWIST}$) remains constant over any and all changes in fluid density.

In a typical U-tube flow meter, the flow conduit 103 is vibrated at a drive frequency. The drive frequency is chosen to substantially match a resonant frequency of the flow conduit 103. The resulting drive mode vibration (i.e., a first out-of-phase bending mode) includes stationary nodes at the ends of the flow conduit 103, while the point of maximum vibrational amplitude occurs at the center of the flow conduit 103, i.e., at the drive system 104. For example, these end nodes can comprise the nodes 603a and 603b shown in FIG. 6.

The twist mode of vibration is excited by the Coriolis force resulting from fluid flow. It is the tube vibration in the twist mode that creates the time delay that is measured by the electronics. In a twist mode of vibration (i.e., a second out-of-phase bending mode), the flow conduit 103 has stationary nodes at the ends of the flow conduit and additionally includes a stationary node at the center (i.e., at the drive system 104). Consequently, in the twist mode the maximum amplitude of the flow conduit 103 occurs at two points located between the drive system 104 and the end nodes.

The twist mode has a twist resonant frequency that is generally higher than the drive frequency. However, the Coriolis force is of greatest amplitude at the drive frequency, rather than the higher twist frequency, and is preferably measured at the drive frequency. The resonant frequency of the twist mode of vibration is generally higher than the resonant frequency of the drive mode of vibration. Therefore, the resulting amplitude of vibration is a function of the frequency difference between the drive frequency and the twist resonant frequency. If the two frequencies are close, the twist amplitude is large. If they are distant, the twist amplitude is small. It can thus be seen that a frequency ratio between the drive frequency and the twist resonant frequency must be kept constant in order to keep the flow calibration factor of the flow meter at a constant level.

The drive and twist frequencies both change when the fluid density changes. The location of mass on the flow tube determines whether the frequency ratio remains constant between the two. Because the drive mode in a typical U-tube flow meter includes nodes at the ends of the flow conduit 103 and because the point of maximum amplitude occurs in the center, locating extra mass at the drive system 104 has the effect of lowering the drive frequency and reducing the effect of fluid density change on the drive frequency. In the twist mode, where there are nodes at both ends of each flow tube as well as one in the center, locating extra mass at the drive system 104 does not affect the twist mode because of the central node. However, locating mass at the points of maximum deflection in the twist mode (between the drive system 104 and the end nodes) reduces the twist mode sensitivity to changes in fluid density.

The solution to this drawback is to form a balance system 600 including at least two spaced apart Y-balance weights 601 on either side of the drive system 104. The at least two Y-balance weights 601 are located upstream and downstream from the drive system 104, as shown in the figure. The mass for the Y-balance weights can thus be located at a distance from the drive system 104 so that the drive and twist frequencies both change the proper amount with changes in fluid density. This distance from the drive system 104 can be determined, such as through finite element analysis, for example, and has been determined to be the distance at which the ratio of frequencies ($\omega_{DRIVE}/\omega_{TWIST}$) stays constant with changes in fluid density. Simultaneously, these weights can be sized so that they are correct for Y-balancing the meter.

The drive system 104 is located a vertical distance $Y_d$ above the bending axis W. The first Y-balance weight 601a is located a vertical distance $Y_{w1}$ above the bending axis W. The second Y-balance weight 601b is located a vertical distance $Y_{w2}$ above the bending axis W. The two or more Y-balance weights 601a and 601b are therefore located according to a Y distance ratio $Y_d/Y_{w1}$ and $Y_d/Y_{w2}$, for example. In one embodiment, one or both of the ratios can be substantially one and one-half (i.e., $Y_d/Y_w=1\frac{1}{2}$). In another embodiment having a different flow tube geometry (and other factors), the ratios can be substantially two. However, other values can be used as desired. In one embodiment, the first ratio $Y_d/Y_{w1}$ is substantially equal to the second ratio $Y_d/Y_{w2}$ (i.e., $Y_d/Y_{w1}=Y_d/Y_{w2}$). However, it should be understood that the distances can vary according to flow conduit size and characteristics, construction tolerances, etc., and the distances therefore can form any size of ratio. Moreover, the two ratios $Y_d/Y_{w1}$ and $Y_d/Y_{w2}$ can differ, and are not necessarily equal.

The actual locations of the Y-balance weights 601, and therefore the distances $Y_{w1}$ and $Y_{w2}$, can be determined experimentally or can be iteratively determined using a Finite Element Analysis (FEA) technique, for example. The desired FEA result maintains a substantially constant $\omega_{DRIVE}/\omega_{TWIST}$ ratio over changes in fluid density of a flow medium in the flow conduit 103. The desired FEA therefore constrains the Y-motion to an acceptable level. In one embodiment, an approximate starting point for the FEA computation initially locates the Y-balance weights 601 half-way vertically to the pickoffs 105 and 105' (i.e., the distance ratios $Y_d/Y_{w1}$ and $Y_d/Y_{w2}$ are approximately=2 and creates an angle from the horizontal that is approximately 45 degrees).

In addition, the mass of each Y-balance weight 601 will have to be calculated when the location has been determined. The mass $M_{split}$ of each individual split Y-balance weight 601 will need to be greater than the mass $M_{single}$ of a single Y-balance weight located at the drive system 104 in order to achieve the same mass balancing effect. The mass $M_{split}$ of an individual Y-balance weight 601a or 601b can be approximately determined through use of the formula:

$$M_{split}=\frac{1}{2}(M_{single})(Y_d/Y_w)^3 \qquad (5)$$

Consequently, as the vertical distance $Y_w$ decreases, the above formula will cause the mass $M_{split}$ to increase.

As in the previously discussed Y-balance weight 501 and leaf spring 504 of FIG. 5, the attachment members 602a and 602b can be at least partially deformable. For example, an attachment member 602 can comprise a spring or leaf spring. Consequently, the attachment members 602a and 602b can deform in response to motion of the flow conduit 103. The deformation of the two or more attachment members 602 and the two or more Y-balance weights 601 cause the natural frequency of the balance system 600 to be less than the drive frequency of the flow meter 5. As a result, the balance system 600 can vibrate out of phase with the flow conduit 103.

The balance system 600 in one embodiment is sized and located such that the combined center of mass of the drive system 104 and the balance system 600 lies substantially proximate a plane of the centerline of the flow conduit 103. In one embodiment, the balance system 600 is located on the substantially opposite side of the flow conduit 103 from the drive system 104 (see FIG. 5). In one embodiment, the balance system 600 is located on the substantially opposite side of the flow conduit 103 from the drive system 104 and at an orientation substantially forty-five degrees to a horizontal plane of the flow conduit 103. The balance system 600 in one embodiment is sized and located such that the momentum of the balance system 600 is substantially equal and opposite to the momentum of the drive system 104 in a direction substantially perpendicular to a drive motion.

It should be understood that more than two Y-balance weights 601 can be used in order to accomplish the objectives of the invention. In addition, various numbers and configurations of attachment members 602 can be employed. The attachment members 602 can include cross-links between Y-balance weights 601, can include multiple attachment members 602 per Y-balance weight 601, can include variously shaped or sized attachment members 602, can include attachment members 602 formed of different materials, can include attachment members 602 having different deformation characteristics, etc.

The above examples are not limited to compensating for the driver mass offset. For instance, deformation of the manifold castings by conduit forces can cause the meter flanges to vibrate in the Y-direction. If this flange vibration is in-phase with that caused by the drive mass offset, then the balance mass can be increased to compensate for the additional vibration due to the manifold deformation. Likewise, if the flange vibration due to manifold deformation is out-of-phase with that caused by the drive mass offset, the balance mass can be made smaller.

What is claimed is:

1. A Coriolis flow meter comprising:
at least one flow conduit (103), with the at least one flow conduit (103) including a first conduit node (603a) and a second conduit node (603b) and including a bending axis W that intersects the flow conduit (103) at the first conduit node (603a) and at the second conduit node (603b), wherein the at least one flow conduit (103) vibrates around the bending axis W;
a drive system (104) coupled to the at least one flow conduit (103); and
a balance system (600) coupled to the at least one flow conduit (103), with the balance system (600) comprising two or more Y-balance weights (601a, 601b) and two or more attachment members (602a, 602b) that couple the two or more Y-balance weights (601a, 601b) to the at least one flow conduit (103), wherein at least a first Y-balance weight (601a) is coupled to the at least one flow conduit (103) at a first location between the first conduit node (603a) and the drive system (104) and at least a second Y-balance weight (601b) is coupled to the at least one flow conduit (103) at a second location between the drive system (104) and the second conduit node (603b).

2. The Coriolis flow meter of claim 1 wherein the drive system (104) is located a vertical distance $Y_d$ above the bending axis W, wherein the first Y-balance weight (601a) is located a vertical distance $Y_{w1}$ above the bending axis W, and wherein the second Y-balance weight (601b) is located a vertical distance $Y_{w2}$ above the bending axis W.

3. The Coriolis flow meter of claim 2 wherein a first ratio $Y_d/Y_{w1}$ is substantially one and one-half to one ($Y_d/Y_{w1}=1\frac{1}{2}:1$).

4. The Coriolis flow meter of claim 2 wherein a first ratio $Y_d/Y_{w1}$ is substantially equal to a second ratio $Y_d/Y_{w2}$.

5. The Coriolis flow meter of claim 2 wherein a first ratio $Y_d/Y_{w1}$ and a second ratio $Y_d/Y_{w2}$ are configured so that a drive frequency versus twist frequency ratio $\omega_{DRIVE}/\omega_{TWIST}$ is substantially constant over changes in fluid density of a flow medium in the at least one flow conduit (103).

6. The Coriolis flow meter of claim 1 wherein the two or more Y-balance weights (601a, 601b) are located at points of maximum deflection of the at least one conduit (103) in a twist mode.

7. The Coriolis flow meter of claim 1 wherein the two or more Y-balance weights (601a, 601b) and the two or more attachment members (602a, 602b) are permanently coupled to the at least one flow conduit (103).

8. The Coriolis flow meter of claim 1 wherein the two or more Y-balance weights (601a, 601b) and the two or more attachment members (602a, 602b) are removably coupled to the at least one flow conduit (103).

9. The Coriolis flow meter of claim 1 wherein the two or more attachment members (602a, 602b) are at least partially deformable in response to motion of the at least one flow conduit (103).

10. The Coriolis flow meter of claim 1 wherein a deformation of the two or more attachment members (602a, 602b) and the two or more Y-balance weights (601a, 601b) cause the natural frequency of the balance system (600) to be less than the drive frequency of the flow meter.

11. The Coriolis flow meter of claim 1 wherein the balance system (600) vibrates substantially out of phase with the at least one flow conduit (103).

12. The Coriolis flow meter of claim 1 wherein the balance system (600) is sized and located such that the combined center of mass of the drive system (104) and the balance system (600) lies substantially proximate a plane of the centerline of the at least one flow conduit (103).

13. The Coriolis flow meter of claim 1 wherein the balance system (600) is located on the substantially opposite side of the at least one flow conduit (103) from the drive system (104).

14. The Coriolis flow meter of claim 1 wherein the balance system (600) is located on the substantially opposite side of the at least one flow conduit (103) from the drive system (104) and at an orientation substantially forty-five degrees to a horizontal plane of the flow conduit (103).

15. The Coriolis flow meter of claim 1 wherein the balance system (600) is sized and located such that the momentum of the balance system (600) is substantially equal and substantially opposite to the momentum of the drive system (104) in a direction substantially perpendicular to a drive motion.

16. The Coriolis flow meter of claim 1 wherein a mass $M_{split}$ of an individual Y-balance weight (601) comprises substantially one-half of a mass of a single, driver-located weight $M_{single}$ multiplied by the cube of a vertical distance $Y_d$ of the drive system (104) above the bending axis W divided by a vertical distance $Y_w$ of the individual Y-balance weight (601) above the bending axis W.

17. A method for force balancing a Coriolis flow meter, the method comprising:
providing at least one flow conduit (103), with the at least one flow conduit (103) including a first conduit node (603a) and a second conduit node (603b) and further including a bending axis W that intersects the flow conduit (103) at the first conduit node (603a) and at the second conduit node (603b), wherein the at least one flow conduit (103) vibrates around the bending axis W;

providing a drive system (104) coupled to the at least one flow conduit (103); and providing a balance system (600) coupled to the at least one flow conduit (103), with the balance system (600) comprising two or more Y-balance weights (601a, 601b) and two or more attachment members (602a, 602b) that couple the two or more Y-balance weights (601a, 601b) to the at least one flow conduit (103), wherein at least a first Y-balance weight (601a) is coupled to the at least one flow conduit (103) at a first location between the first conduit node (603a) and the drive system (104) and at least a second Y-balance weight (601b) is coupled to the at least one flow conduit (103) at a second location between the drive system (104) and the second conduit node (603b).

18. The method of claim 17 wherein the drive system (104) is located a vertical distance $Y_d$ above the bending axis W, wherein the first Y-balance weight (601a) is located a vertical distance $Y_{w1}$ above the bending axis W, and wherein the second Y-balance weight (601b) is located a vertical distance $Y_{w2}$ above the bending axis W.

19. The method of claim 18 wherein a first ratio $Y_d/Y_{w1}$ is substantially one and one-half to one ($Y_d/Y_{w1}=1\frac{1}{2}:1$).

20. The method of claim 18 wherein a first ratio $Y_d/Y_{w1}$ is substantially equal to a second ratio $Y_d/Y_{w2}$.

21. The method of claim 18 wherein a first ratio $Y_d/Y_{w1}$ and a second ratio $Y_d/Y_{w2}$ are configured so that a drive frequency versus twist frequency ratio $\omega_{DRIVE}/\omega_{TWIST}$ is substantially constant over changes in fluid density of a flow medium in the at least one flow conduit (103).

22. The method of claim 17 wherein the two or more Y-balance weights (601a, 601b) are located at points of maximum deflection of the at least one conduit (103) in a twist mode.

23. The method of claim 17 wherein the two or more Y-balance weights (601a, 601b) and the two or more attachment members (602a, 602b) are permanently coupled to the at least one flow conduit (103).

24. The method of claim 17 wherein the two or more Y-balance weights (601a, 601b) and the two or more attachment members (602a, 602b) are removably coupled to the at least one flow conduit (103).

25. The method of clan 17 wherein the two or more attachment members (602a, 602b) are at least partially deformable in response to motion of the at least one flow conduit (103).

26. The method of claim 17 wherein a deformation of the two or more attachment members (602a, 602b) and the two or more Y-balance weights (601a, 601b) cause the natural frequency of the balance system (600) to be less than the drive frequency of the flow meter.

27. The method of claim 17 wherein the balance system (600) vibrates substantially out of phase with the at least one flow conduit (103).

28. The method of claim 17 wherein the balance system (600) is sized and located such that the combined center of mass of the drive system (104) and the balance system (600) lies substantially proximate a plane of the centerline of the at least one flow conduit (103).

29. The method of claim 17 wherein the balance system (600) is located on the substantially opposite side of the at least one flow conduit (103) from the drive system (104).

30. The method of claim 17 wherein the balance system (600) is located on the substantially opposite side of the at least one flow conduit (103) from the drive system (104) and at an orientation substantially forty-five degrees to a horizontal plane of the flow conduit (103).

31. The method of claim 17 wherein the balance system (600) is sized and located such that the momentum of the balance system (600) is substantially equal and substantially opposite to the momentum of the drive system (104) in a direction substantially perpendicular to a drive motion.

32. The method of claim 17 wherein a mass $M_{split}$ of an individual Y-balance weight (601) comprises substantially one-half of a mass of a single, driver-located weight $M_{single}$ multiplied by the cube of a vertical distance $Y_d$ of the drive system (104) above the bending axis W divided by a vertical distance $Y_w$ of the individual Y-balance weight (601) above the bending axis W.

* * * * *